United States Patent [19]

Tanaka

[11] Patent Number: 5,072,432
[45] Date of Patent: Dec. 10, 1991

[54] MAGNET TURN-OVER MECHANISM FOR RECORDING AND/OR ERASING AN INFORMATION ON AND FROM A MAGNETO-OPTICAL DISK BY SELECTIVELY APPLYING A FIRST AND A SECOND PREDETERMINED MAGNETIC FIELDS

[75] Inventor: Masashi Tanaka, Musashino, Japan
[73] Assignee: TEAC Corporation, Japan
[21] Appl. No.: 436,413
[22] Filed: Nov. 14, 1989

[30] Foreign Application Priority Data
Nov. 16, 1988 [JP] Japan .......................... 63-149632[U]

[51] Int. Cl.⁵ .......................... G11B 5/03; G11B 13/04
[52] U.S. Cl. ........................................ 369/13; 360/59; 360/114
[58] Field of Search ............... 369/13, 14, 15; 360/59, 360/114, 77.03, 78.11

[56] References Cited

U.S. PATENT DOCUMENTS

| | | | |
|---|---|---|---|
| 4,516,177 | 5/1985 | Moon et al. | 360/77.03 |
| 4,701,895 | 10/1987 | Van Sant | 369/13 |
| 4,742,213 | 5/1988 | Conant | 235/449 |
| 4,748,606 | 5/1988 | Naito et al. | 369/13 |
| 4,969,056 | 11/1990 | Negishi et al. | 360/77.03 |
| 4,979,158 | 12/1990 | Yoda | 360/59 |

FOREIGN PATENT DOCUMENTS

| | | |
|---|---|---|
| 290281 | 11/1988 | European Pat. Off. . |
| 63-160002 | 1/1988 | Japan . |
| 63-316346 | 7/1988 | Japan . |
| 0251455 | 10/1989 | Japan .................................... 369/13 |
| 0078056 | 3/1990 | Japan .................................... 369/13 |

OTHER PUBLICATIONS

Introduction to Robotics-Arthur J. Critchlow-pp. 125-127, Macmillan Publishing Company, Copyright 1985.

Primary Examiner—Stuart S. Levy
Assistant Examiner—Tan Nguyen
Attorney, Agent, or Firm—Andrus, Sceales, Starke & Sawall

[57] ABSTRACT

A magnet turn-over mechanism for turning a permanent magnet used for applying first and second predetermined magnetic fields selectively to a magneto-optical disk for recording and/or erasing an information on and from the magneto-optical disk comprises support mechanism for supporting the permanent magnet rotatably in a vicinity of the magneto-optical disk such that a first magnetic pole an a second magnetic pole are selectively directed to the magneto-optical disk, driving device for turning the permanent magnet supported by the support mechanism, optical modulation device moved together with the turning of the permanent magnet for producing a modulated optical output indicative of an angular position of the permanent magnet caused by the turning of the permanent magnet by modulating an optical radiation supplied thereto, and optical angular position detection device supplied with the modulated optical output frm the optical modulation device for detecting the angular position of the permanent magnet.

4 Claims, 4 Drawing Sheets

MAGNET TURN-OVER MECHANISM FOR RECORDING AND/OR ERASING AN INFORMATION ON AND FROM A MAGNETO-OPTICAL DISK BY SELECTIVELY APPLYING A FIRST AND A SECOND PREDETERMINED MAGNETIC FIELDS

BACKGROUND OF THE INVENTION

The present invention generally relates to magneto-optical recording of informations on a magneto-optical disk and more particularly to a recording system for recording and/or erasing an information signal on and from a magneto-optical disk by a finely focused optical beam while applying a predetermined magnetic field across the disk.

Generally, a magneto-optical recording and reproducing apparatus records an information on a magneto-optical disk by a recording head which irradiates a finely focused optical beam on a recording surface of the disk to cause a local heating of a magnetic recording medium on the recording surface of the disk while applying a predetermined magnetic field across the disk. When erasing the information already recorded on the disk, on the other hand, the direction of the magnetic field thus established has to be reversed. The recording head having a capability of such an inversion of the magnetic field will be referred to hereinafter a magneto-optical recording head or simply a recording head. As a means for producing such a reversible magnetic field, a permanent magnet or an electromagnet is used commonly, wherein permanent magnet is preferred from the view point of reducing the size of the recording head. When a permanent magnet is used for this purpose, a magnet turn-over mechanism for turning the magnet such that the S-pole and the N-pole of the magnet are selectively faced to the recording surface of the disk is needed for changing the direction of the magnetic field.

In order to record or erase the information on or from the magneto-optical disk with reliability, it is necessary to control the foregoing mechanism for turning the magnet such that the N-pole or S-pole of the permanent magnet is precisely directed to the disk. In other words, the permanent magnet has to be directed such that the magnetic flux produced by the magnet is passed substantially perpendicularly to the surface of the disk at a location of the disk where the recording medium is heated by the irradiation of the focused optical beam. For this purpose, the recording head of the conventional magneto-optical disk apparatus has a means for detecting the rotation or turning of the permanent magnet and further for properly controlling the turning of the magnet caused by the foregoing mechanism. In a typical example, a Hall element is used for the detection of the turning of the magnet and for stopping the energization of a motor used in the mechanism for causing the turning-over of the magnet. In another typical example, a limit switch is provided for detection of the turning of the magnet and for deenergizing the motor.

In the first type of the magnet turn-over mechanism in which the Hall element is used for detecting the rotation of the permanent magnet, although there is an advantage in that it is capable of discriminating the N-pole and the S-pole, there is a problem that the accurate detection of the rotational angle or the state of the permanent magnet is difficult. Further, there is another problem that separate Hall elements have to be used for the detection of the magnetic field and for the positioning of the magnet in order to discriminate the magnetic pole and the rotational angle of the magnet at the same time. Such a use of two separate Hall elements complicates the construction of control circuit used for control the magnet turn-over mechanism. In the second type of the magnet turn-over mechanism in which mechanical switches such as the limit switch is used for detection of the rotational angle of the magnet, there is a problem of durability such that the mechanical contacts tends to be worn out when used for a prolonged time period.

SUMMARY OF THE INVENTION

Accordingly, it is a general object of the present invention to provide a novel and useful magnet turn-over mechanism of a magneto-optical disk apparatus for reversing a magnetic field applied across a magneto-optical disk wherein the foregoing problems are eliminated.

Another object of the present invention is to provide a magnet turn-over mechanism of a magneto-optical disk apparatus for reversing a magnetic field applied across a magneto-optical disk, wherein detection of an angular position of a permanent magnet used for applying a predetermined magnetic bias for recording and/or erasing an information on and from a magneto-optical disk is made with improved precision.

Another object of the present invention is to provide a magnet turn-over mechanism and system of a magneto-optical disk apparatus for turning over a permanent magnet used for applying a predetermined magnetic field across a magneto-optical disk for recording and/or erasing information on and from the disk, comprising optical detection means for detecting an angular position of the permanent magnet. According to the present invention, an accurate detection of the angular position of the permanent magnet is achieved with a simple construction. Further, the durability of the recording head is significantly improved as a result of elimination of mechanical detection means.

Other objects and further features of the present invention will become apparent from the following detailed description of preferred embodiments when read in conjunction with attached drawings.

DETAILED DESCRIPTION

Figure 1:
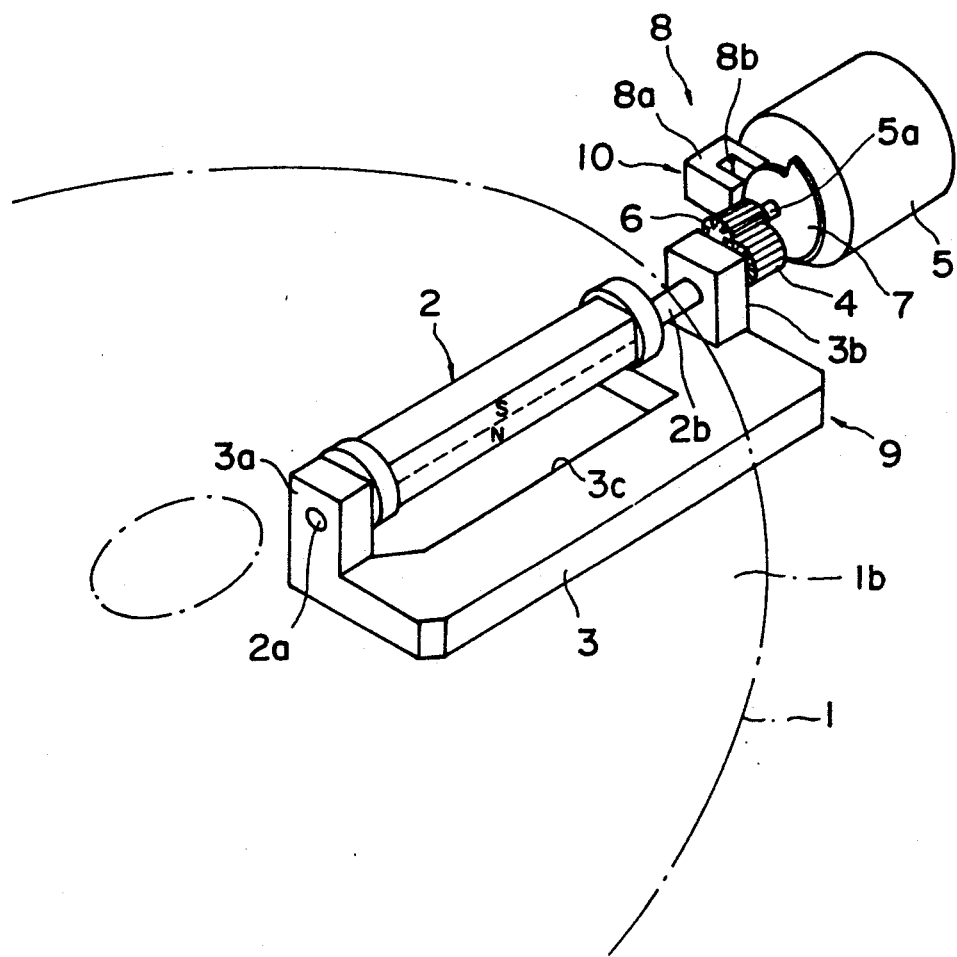
FIG. 1 is a perspective view showing an embodiment of a magnet turn-over mechanism used in a recording head of a magneto-optical disk apparatus for inverting a magnetic field applied across a magneto-optical disk according to the present invention.
Figure 2:
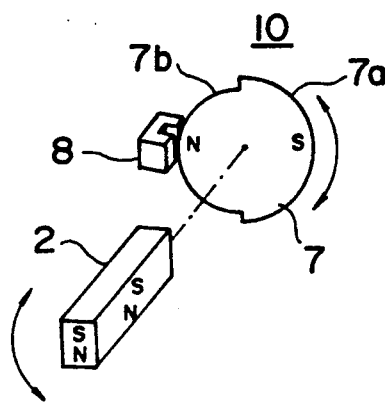
FIG. 2 is a schematical view showing the magnet turn-over mechanism for detecting and controlling a rotational angle of a permanent magnet used in the mechanism of FIG. 1.
Figure 3:
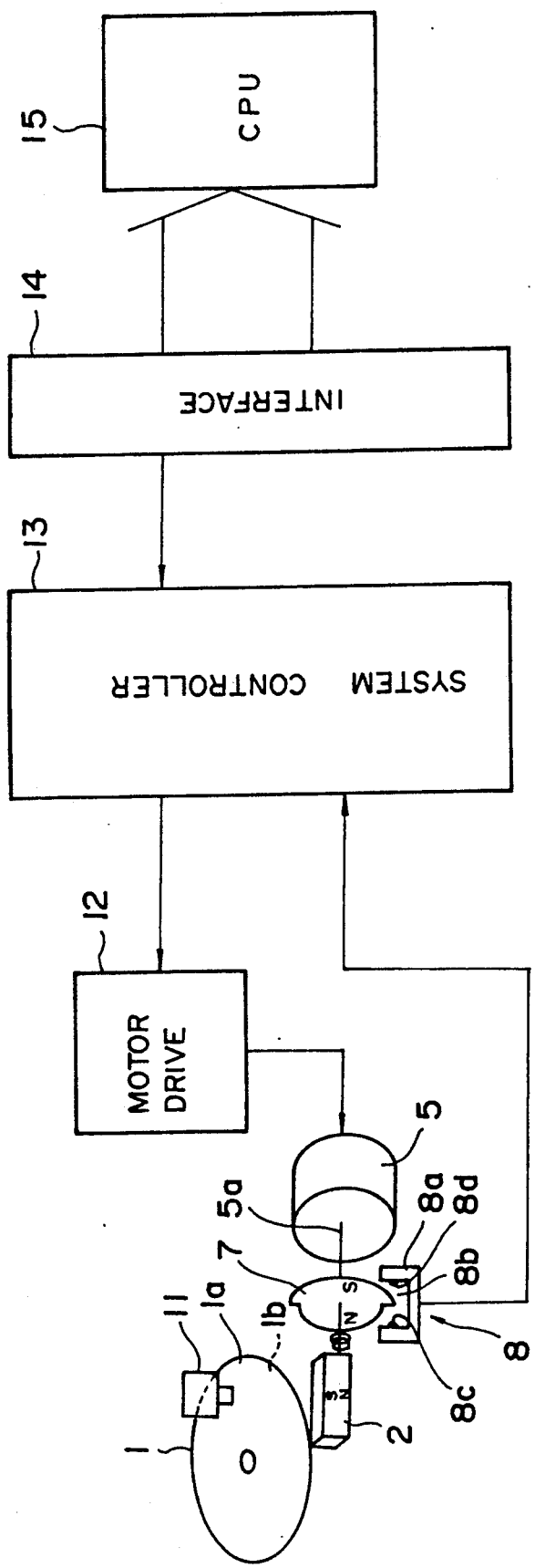
FIG. 3 is a block diagram showing a control system used for controlling a stepping motor used in the mechanism of FIG. 1 for rotating the permanent magnet.

FIGS. 1 through 3 show an embodiment of a magnet turn-over mechanism for use in a recording head of a magneto-optical disk apparatus for inverting a magnetic field applied to a magneto-optical disk.

Referring to FIG. 1, the mechanism comprises a bar-shaped permanent magnet 2 provided at a lower side 1b of a magneto-optical disk 1 for applying a magnetic field across the disk 1. This magnetic field is used for recording or erasing of information on or from the disk 1. The permanent magnet 2 is held by a pair of brackets 3a and 3b unitarily provided on a support base 3 in a rotatable manner about a pair of shafts 2a and 2b extending at both sides of the magnet 2. Note that the magnet 2 is held at the lower side 1b of the disk 1 so as to extend parallel in a radial direction thereof.

The permanent magnet 2 is magnetized along an elongating direction such that an upper half thereof is magnetized to the S-pole and an lower half thereof is magnetized to the N-pole in the illustrated state. Thus, responsive to a 180 degree rotation about the shafts 2a and 2b, the N-pole and the S-pole of the magnet are faced to the disk 1 alternately. Such a 180 degree rotation is made responsive to switching between a recording mode and an erasing mode. For the simplicity of description, it is assumed hereinafter that the S-pole of the magnet 2 is directed to the magneto-optical disk 1 for recording and that the N-pole of the magnet 2 is directed to the disk 1 for erasing.

The shaft 2b of the magnet 2 carries a drive gear 4 which is driven by a stepping motor 5. Thus, a gear 6 provided at an end of an output shaft 5a of the stepping motor 5 is meshed with the gear 4 and the magnet 2 is turned over responsive to the energization of the stepping motor 5. In the illustrated example, the stepping motor 5 rotates its output shaft 5a by an angle of 18 degrees responsive to a single driving pulse. The gear 4 and the gear 6 have an identical number of teeth and transmits the rotation of the shaft 5a to the magnet 2 without reduction. Alternatively, the permanent magnet 2 may be provided on the output shaft 5a directly. The construction illustrated is preferred, however, because it provides an opportunity for adjusting the position of the magnet 2 precisely.

In the magnet turn-over mechanism of the present invention, the output shaft 5a carries an angular position detection plate 7 which is used for detecting whether it is the N-pole or the S-pole that is currently facing the magneto-optical disk 1. As illustrated in FIG. 2, this detection plate 7 is actually a generally circular visor plate having a photo-interrupting part 7a having an enlarged diameter and extending for an angle of 180 degrees and a photo-transmitting part 7b having a reduced diameter and extending for another 180 degrees.

In cooperation with the detection plate 7, there is provided a photo-interrupter 8 comprising a U-shaped member 8a carrying a light source 8c (FIG. 3) and a photodetector 8d (FIG. 3) at a pair of opposing legs thereof such that the detection plate 7 is located between the pair of legs. When the detection plate 7 is at an angular position such that the photo-interrupting part 7a is accepted in a gap 8b between the legs of the member 8a, the light emitted by the light source 8c is interrupted and not received by the photodetector 8d. Responsive thereto, the photo-interrupter 8 produces a low level output L. When the detection plate 7 accepted in the gap 8b of the member 8a is rotated further to a state in which the photo-transmitting part 7b enters into the gap, the photodetector 8d receives the light from the light source 8c and the photo-interrupter 8 produces a high level output H. As the gear ratio of the gear 4 and the gear 6 is one, the angular position detection plate 7 is rotated together with the magnet 2 and there is a one-to-one correspondence between the angular position of the magnet bar 2 and the angular position of the plate 7.

At the moment when a leading edge of the photo-interrupting part 7a has just entered into the gap 8b responsive to the change of the state of the magneto-optical disk apparatus from the erasing mode to the recording mode, for example, the permanent magnet 2 is in a state that it has been rotated for an angle of only 90 degrees from the previous state in which the N-pole is directed straight to the disk 1 for erasing, and a further rotation for another 90 degrees of the magnet 2 is needed in order that the S-pole of the magnet 90 is properly directed to the disk 1. The reason of such a construction will be described later with reference to FIG. 4. Thus, when switching to the recording mode, the energization of the stepping motor 5 is stopped for the first time when the magnet 2 is rotated for the another 90 degrees after the output of the photo-interrupter 8 is changed to the state L.

Similarly, when switching the mode of the magneto-optical disk apparatus from the recording mode to the erasing mode, the energization of the motor 5 is stopped only when the magnet 2 is rotated for another 90 degrees after the photo-transmission part 7b is entered to the gap 8b of the photo-interrupter 8 and the output of the photo-interrupter 8 is changed to the state L.

Note that the construction of the recording head is not limited to the one described heretofore in which the angular position detection plate 7 is directly mounted on the output shaft 5a of the motor 5 but the plate 7 may be mounted on the shaft 2a or 2b of the permanent magnet 2.

As described heretofore, the magnet turn-over mechanism of the present invention comprises the permanent magnet 2, the support base 3, transmission gears 4 and 6, the stepping motor 5, and a positioning mechanism 10 which in turn comprises the angular position detection plate 7 and the photo-interrupter 8.

FIG. 3 shows an overall construction of the recording head system of a magneto-optical disk apparatus of the present invention including the foregoing magnet turn-over mechanism and a control system used for controlling the magnet turn-over mechanism. The recording head comprises an optical pickup device 11 facing an upper side 1a of the disk 1 when the disk 1 is properly mounted in the apparatus, while the lower side 1b of the disk 1 faces the magnet 2 as already described. Responsive to the localized heating of the disk 1 by the optical beam from the optical pickup device 11, the recording or erasing is made depending on the direction of the magnetic field applied across the disk as is well known. This magnetic field is produced by the permanent magnet 2 which is rotated by the magnet turn-over mechanism as already described.

The energization of the motor 5 is controlled by a motor drive circuit 12 which controls the rotational angle of the output shaft 5a. The circuit 12 in turn is connected to a system controller 13 which is fed with the output of the photo-interrupter 8 indicating the angular position of the angular position detection plate 7. Further, the system controller 13 is connected to a central processing unit (CPU) 15 via an interface 14. This CPU 15 controls the overall operation of the magneto-optical disk apparatus. The system controller 13 further has a means to control the rotational angle of the output shaft 5a of the motor 5 as will be described.

Next, the processing performed by the system controller 13 will be described with reference to FIGS. 4 and 5.

Referring to FIG. 5(A), the CPU 15 supplies an erasing/recording command to the system controller 13 via the interface 14. When this command takes a high level state H, the system controller 13 produces a magnetic field inversion command as shown in FIG. 5(B) for inverting the magnetic field applied across the disk 1. Responsive to this magnetic field inversion command, the motor drive circuit 12 produces a motor drive signal comprising a number of drive pulses as shown in FIG. 5(C) and the stepping motor 5 is driven accordingly. In the illustrated example, ten (10) such drive pulses are produced each corresponding to the unit rotation of the motor 5 which is equal to 18 degrees. As a result, the output shaft 5a of the motor 5 is rotated by 180 degrees and the permanent magnet 2 is turned-over exactly for 180 degrees via the transmission gears 4 and 6.

Figure 4:
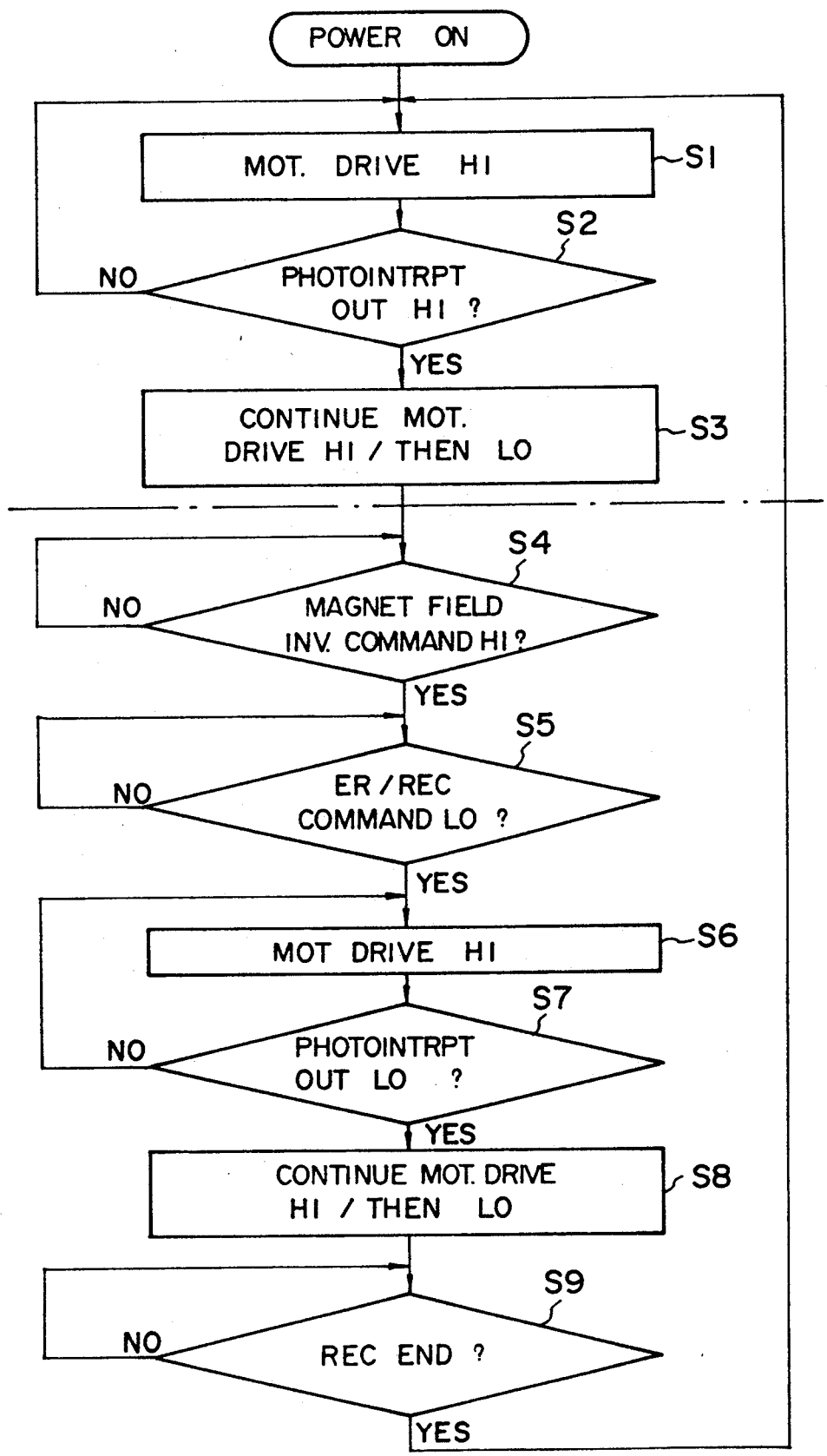
FIG. 4 is a flowchart performed by the control system of FIG. 3.
Figure 5:
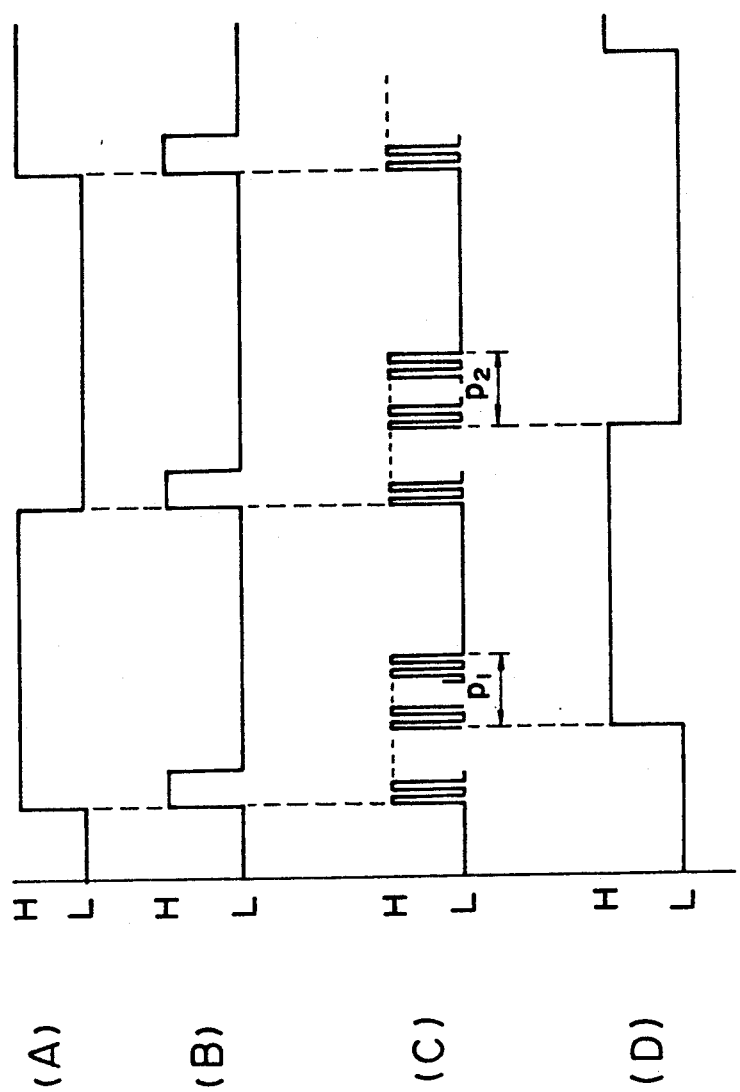
FIGS. 5(A)-(D) are timing charts showing veious signals produced in the system of FIG. 3 responsive to the rotation of the permanent magnet in the mechanism of FIG. 1.

FIG. 4 shows the operation of the controller 13. In a step 1 immediately following the power-on of the magneto-optical disk apparatus, the stepping motor 5 is driven until it is detected that the output of the photo-interrupter 8 is changed from the state L to the state H (see FIG. 5(D)). These steps 1 and 2 are for the initialization purpose and are needed because the angular position of the magnet 2 is not definite at the moment when the apparatus is turned on. When it is detected in the step 2 that the output of the photo-interrupter 8 is changed to the state H, this means that the leading edge of the photo-transmission part 7b of the angular position detection plate 7 or the trailing edge of the photo-interruption part 7a has entered into the gap 8b of the U-shaped member 8a constituting the photo-interrupter 8. In this state, the permanent magnet 2 has been rotated by 90 degrees since the initial state if the N-pole is directed straight to the disk 1 in the foregoing initial state.

After the step 2, the motor drive signal is continuously supplied for several steps (shown as "P1" in FIG. 5(C)) in a step 3 so that the motor 5 is continuously driven for another predetermined angle. In the present embodiment, this predetermined angle is set to 90 degrees. In correspondence thereto, the number of drive pulses given in the step 3 is set to five. The reason that such additional rotation in the step 3 is used is to eliminate an oscillatory movement of the motor 5 which may appear when the energization of the motor 5 is immediately stopped responsive to the change of the state of the photo-interrupter 8. More specifically, in a hypothetical case when the motor 5 is deenergized immediately responsive to the change of the output of the photo-interrupter 8 to the state H, the motor shaft 5a is once moved further forward by the inertia causing an overshoot and then moved backward by the magnetic attraction between the rotor and the stator. Thereby, the overshoot may appear again in the backward direction and if this occurs, the output of the photo-interrupter 8 is returned to the state L. In other words, there is a case that the output of the photo-interrupter 8 is oscillated between the state H and the state L. When the motor 5 is driven responsive to the states H and L, such an oscillatory movement of the motor is amplified and is continued for ever. In order to avoid such an unstable operation, the motor 5 is kept on moving in the step 3 for another 90 degrees in the present invention, and thereby a precise angular position detection as well as a precise control of the angular position of the magnet 2 are achieved with reliability.

After the step 3, the apparatus is in the stand-by mode. In a next step 4, the system controller 13 monitors if the magnetic field inversion command produced presently is in the state H or not until the result becomes YES. Responsive thereto, it is further discriminated in a step 5 if the erasing/recording command from the CPU 15 is in the state L for recording or not until the result of discrimination becomes YES. During the steps 4 and 5, the magnetic pole directed to the disk 1 is the N-pole used for erasing. Responsive to the result of the discrimination becoming YES in the step 5, the motor drive signal is supplied to the motor 5 in a step 6 with the state H until it is discriminated in a step 7 that the output of the photo-interrupter 8 is changed to the state L indicating that the shaft 5a of the motor 5 is rotated for 90 degrees and the leading edge of the photo-interrupting part 7a of the angular position detection plate 7 has entered into the gap 8b of the photo-interrupter 8.

When the output of the photo-interrupter 8 is changed to the state L as shown in FIG. 5(D), the motor drive circuit 12 continuously produces the drive pulses for another several steps P2 as shown in FIG. 5(C) in a step 8 similarly to the foregoing step 3. This step P2 is identical to the step P1. In this state, the permanent magnet 2 is rotated for 180 degrees from the previous state in the steps 3 through 5 and the S-pole for recording is directed to the lower side 1b of the disk 1. In other words, the magnet 2 is directed such that the magnetic flux is converged to the S-pole passing through the disk 1 perpendicularly at the location of the disk where it is heated by the optical beam. Thereby, the recording of the information is made on the disk 1.

Further, in a step 9, it is discriminated if the erasing-/recording command from the CPU 15 is changed to the state L or not. If YES, this means that the change of the mode of the apparatus to the erasing mode is commanded and the steps from the step 2 are repeated.

As described heretofore, the present invention provides an accurate positional detection as well as accurate positional control of the permanent magnet 2 in the recording mode and in the erasing mode by the optical detection of the rotational angle of the angular position detection plate 7 rotating together with the magnet 2, by the photo-interrupter 8. In the present invention, the control system can be significantly simplified as compared to the prior art system using the Hall elements and still, the application of the magnetic field to the disk 1 can be made precisely such that the magnetic flux passes exactly perpendicularly to the disk at the portion where it is heated by the optical beam. Thereby, the recording and erasing of the information can be made reliably. Further, the problem of the limited lifetime pertinent to the prior art mechanical detection system is eliminated as a result of the optical detection system comprising the angular position detection plate 7 and the photo-interrupter 8. Thereby, the durability of the system is improved.

It should be noted that the construction of the angular position detection plate 7 is not limited to the one illustrated in FIG. 2 but may be replaced by a plate carrying reflection part or through hole for the angular position detection.

Further, the present invention is not limited to these embodiments but various variations and modifications may be made without departing from the scope of the invention.

What is claimed is:

1. A magnet turn-over mechanism for turning a permanent magnet used for applying first and second predetermined magnetic fields opposing each other selectively to a magneto-optical disk for recording and/or erasing information on and from the magneto-optical disk, comprising:

support means for supporting the permanent magnet rotatably in the vicinity of the magneto-optical disk such that a first magnetic pole and a second magnetic pole are selectively directed to the magneto-optical disk;

driving means for turning the permanent magnet supported by the support means;

optical modulation means moved together with the turning of the permanent magnet for producing a modulated optical output indicative of an angular position of the permanent magnet caused as a result of the turning of the permanent magnet by modulating an optical radiation supplied thereto, said optical modulation means comprising a generally circular disk including a first part having a preselected diameter and extending for an angle of 180° and a second part having a diameter that is decreased with respect to said preselected diameter and extending for an angle of 180°, said disk being provided between the driving means and the permanent magnet and rotated with a one-to-one correspondence to the angular position of the permanent magnet, said modulated optical output being produced in response to an interruption of the optical radiation by said first part of said disk and in response to a transmission of the optical radiation past said second part of said disk; and optical angular position detection means supplied with the modulated optical output from the optical modulation means for detecting the angular position of the permanent magnet, said angular position detection means comprising a U-shaped member carrying a light source on one leg for producing the optical radiation and a single photodetector on an opposing leg for detecting the modulated optical output, said optical angular position detection means being provided such that said optical modulation means is located between said pair of legs for modulating the optical radiation.

2. A magnet turn-over mechanism as claimed in claim 1 in which said driveway means comprises a stepping motor and said disc is mounted on an output shaft of the stepping motor.

3. A magnet turn-over mechanism as claimed in claim 1 in which said permanent magnet is supported on the support means such that a first magnetic pole of the permanent magnet is directed to the magneto-optical disk after continuous turning of the permanent magnet for a predetermined angle when a first modulated optical output is produced responsive to a leading edge of said first part of said disk and such that a second magnetic pole of the permanent magnet is directed to the magneto-optical disk after continuous turning of the permanent magnet for said predetermined angle when a second modulated optical output is produced responsive to a trailing edge of said first part of said disk.

4. A magnet turn-over mechanism as claimed in claim 3 in which said predetermined angle is 90 degrees.

* * * * *